3,099,927
INFINITELY VARIABLE TRANSMISSION
Arnold E. Anderson, Livonia, Mich., assignor to Ford Motor Company, Dearborn, Mich., a corporation of Delaware
Filed Sept. 9, 1960, Ser. No. 54,980
12 Claims. (Cl. 74—796)

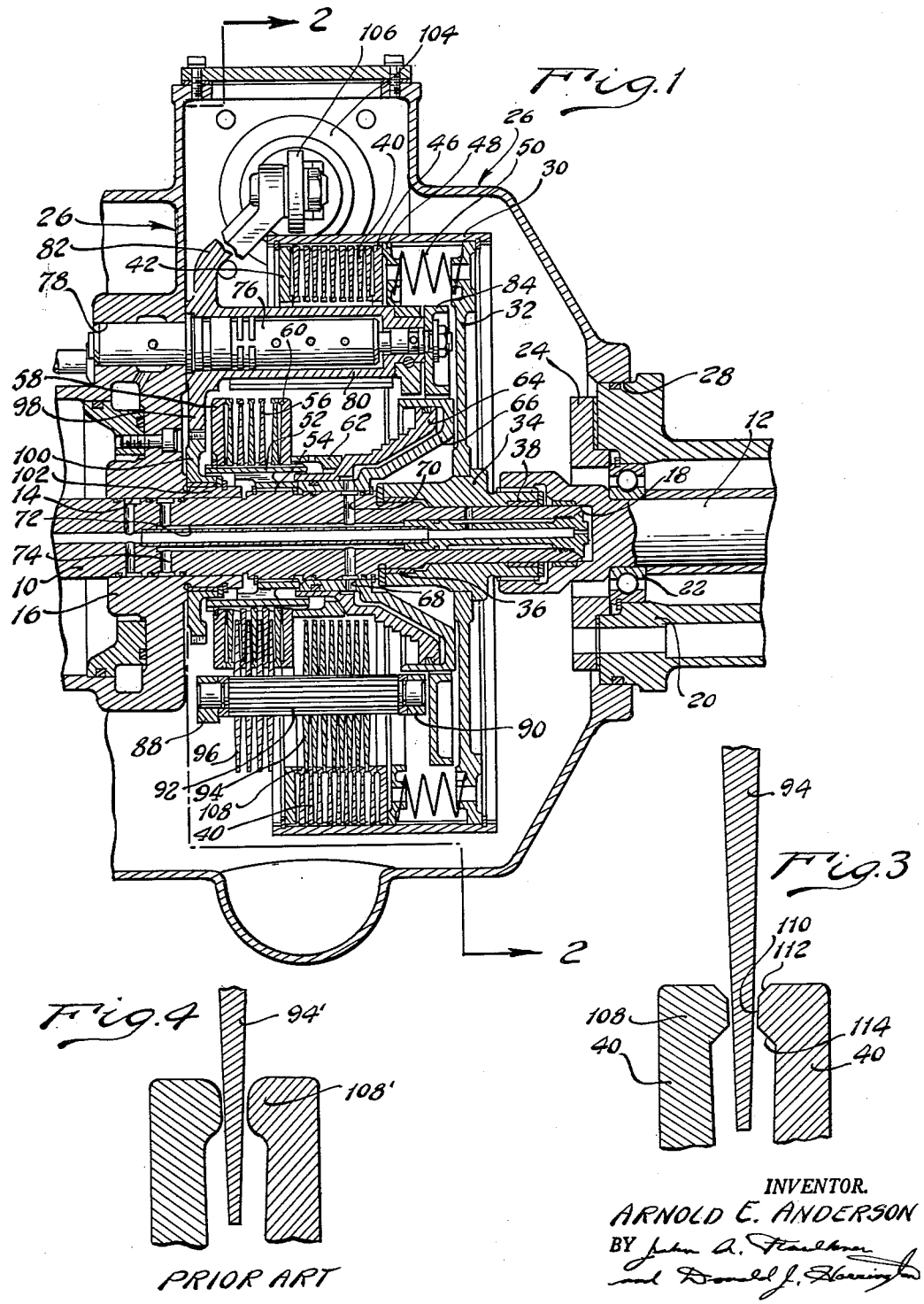

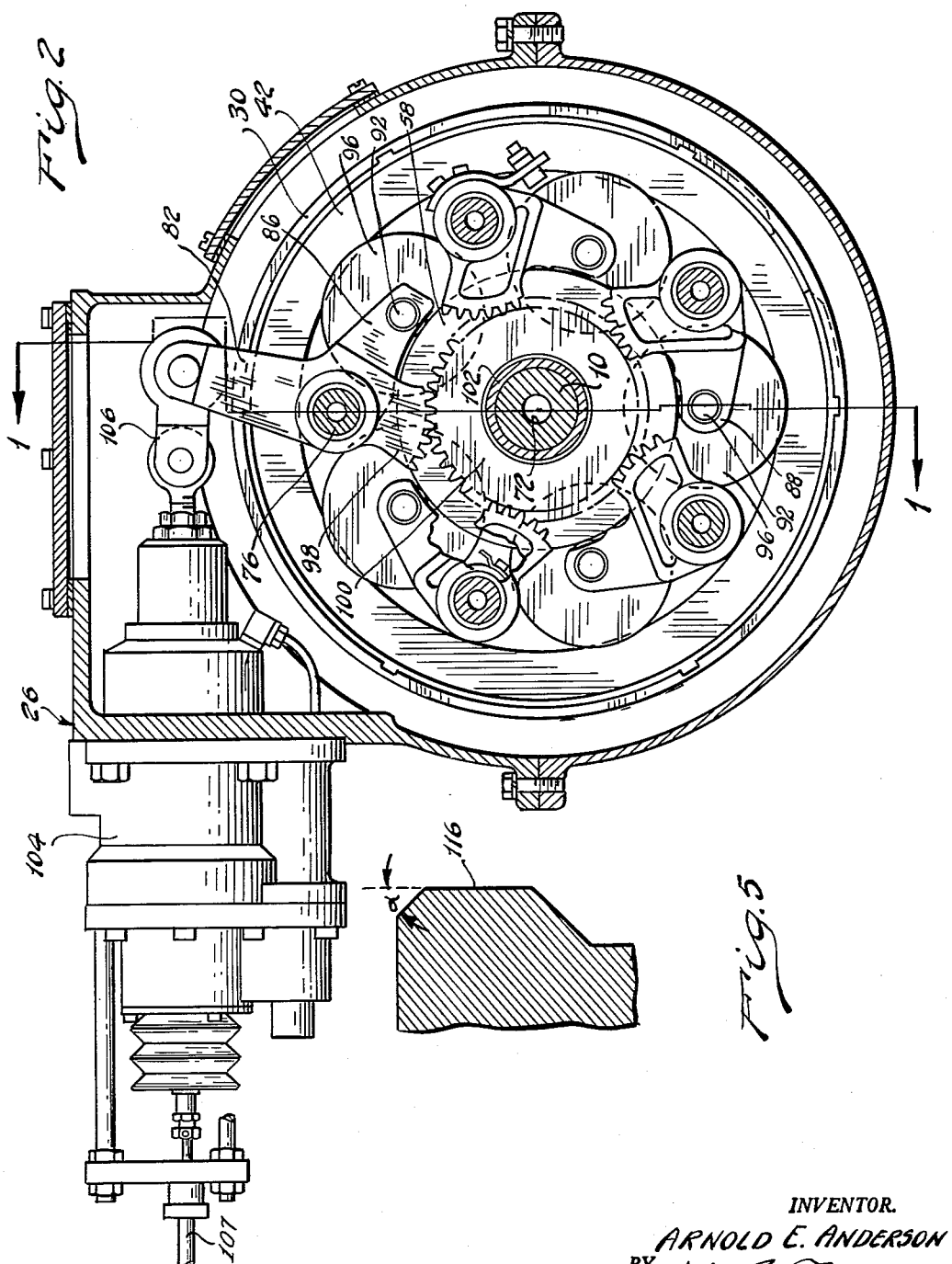

My invention relates generally to power transmission mechanisms, and more particularly to a friction disc drive capable of delivering torque from a driving member to a driven member.

The improvement of my invention is particularly adapted to be used in a disc drive having an infinitely variable torque ratio characteristic. I am aware of various infinitely variable drives which employ friction disc torque delivery elements wherein the discs are arranged in frictional driving engagement, the rim portion of one disc engaging the surface of an adjacent disc. Usually separate assemblies of driving discs and driven discs are provided, the cooperating discs of both assemblies being disposed in interdigital relationship. Clamping pressure can be applied to the disc assemblies in order to maintain the discs of one assembly in frictional driving engagement with the discs of the other assembly.

The rim portions of the discs of one assembly are usually formed with radii on the radially inward and the radially outward edges thereof. The discs of the other assembly are usually formed with a conical profile, the conical surfaces being engageable with the rim portions of the cooperating discs. The discs operate within a housing which contains lubricating oil so that a lubricating oil film is formed in the contact region at the rim portion of the rimmed discs and at the profile surface of the tapered discs.

I have observed that the oil film which develops between the cooperating friction surfaces in conventional disc drives of the type above described becomes excessive as the speed of rotation of the friction discs increases. This result in a loss of torque transmitting capacity during operation at the higher speeds. This is accompanied by a reduction in the mechanical efficiency of the mechanism, and the rate of wear of the friction discs under such condition is undesirably high.

Further, the performance characteristics of friction disc drives of known construction will change after continued use by reason of the fact that the cooperating friction surfaces on the discs are subject to excessive wear. The performance characteristics of any given unit therefore depend upon the speed at which it operates and the total operating time to which it has been subjected.

I have overcome these disadvantages by providing a rim profile for the friction discs which will reduce the rate of oil film formation between the cooperating friction surfaces of the discs and which will result in an increased torque transmitting capacity of the drive at high rim velocities.

The cooperating discs in my improved disc drive include an assembly of conical discs and a separate assembly of rimmed discs, the conical surfaces of the conical discs being engaged by the rim portions of the rimmed discs. The rim portions of the rimmed discs comprise a flat conical segment with a cone angle equal to the cone angle of the surfaces of the conical discs. The rim portions of the rimmed discs are also formed with chamfered edges so that there is a sharp discontinuity between the juxtaposed profiles of the conical discs and the rimmed discs.

In certain prior art arrangements, the rimmed discs are formed with a rounded cross section or with a cross section having edges with relatively large radii. When a clamping pressure is applied to the rimmed discs in such prior art arrangements, and when the discs are operated in a housing where a supply of lubricating oil is in abundance, an oil film will develop between the cooperating friction surfaces of the discs. As the speed of rotation increases, the oil film will become progressively thicker, and this condition is encouraged by the large radii at the edges of the disc rim portions. Shear stresses are established in the contact region of the discs, and the point of maximum stress is centrally located with respect to the edges. This condition is a result of the large radii at the outer and inner margins of the contact region which makes possible a substantial degree of cross flow in a radial direction in the contact region. This cross flow increases as the operating speeds increase.

By way of contrast with their prior art construction, the sharp discontinuity in the profile of the rim portion of the rimmed discs in my improved drive results in a pressure concentration in the oil film at the radially inward edge and at the radially outward edge of the contact region. The stresses established in the oil film at each point of discontinuity is therefore substantially larger in magnitude than the corresponding stress at points on the interior of the contact region. When the chamfer angle is increased, the magnitude of this stress differential is increased. By way of illustration, in one operating embodiment of my improved drive, the stresses at the radially inward and outward edges of the contact region are equal to 3.2 times the corresponding stress at a point intermedaite the inner and outer edges when the chamfer angle is 90°. When the chamfer angle is reduced to 45°, the ratio of the stresses at the inner and outer margins of the contact region to the stress at the intermediate point is equal to 1.4.

The existence of such a stress concentration will reduce the tendency for a cross flow to develop in the oil film. Since the pressure concentration at the intermediate region is less than that at the outer margin of the contact region, the normal tendency for the fluid to flow from the center of the contact region is impeded. This in turn results in a substantial reduction in cross flow, and because of this the rate of oil film formation in the contact region is substantially retarded.

The performance can be controlled as desired by suitably altering the width of the contact surface and the chamfer angles. Once a maximum performance condition has been established, the performance characteristics will not vary from an optimum value to any appreciable extent when the operating speeds are increased.

The improved wiping action of the rimmed discs in my improved friction drive results in a more efficient oil film formation and an increased mechanical efficiency.

The chamfered rim profiles on the rimmed discs of my improved drive will also result in a rather rapid film formation upon starting.

Although the rate of wear in my improved disc drive is slight, the variation in capacity for any given amount of wear will be relatively slight in comparison to the capacity variation resulting from wear in conventional disc drive constructions.

For the purpose of particularly describing a preferred embodiment of my invention, reference will be made to the accompanying drawings wherein:

FIGURE 1 is a cross sectional assembly view of a disc drive embodying friction discs that incorporate the improved profiles above described;

FIGURE 2 is a partial sectional view taken along section line 2—2 of FIGURE 1, and it shows a means for automatically adjusting the speed ratio of the disc drive of FIGURE 1;

FIGURE 3 is an enlarged partial cross sectional view of a conical disc and cooperating rimmed discs for the drive of FIGURES 1 and 2;

FIGURE 4 is a view corresponding to FIGURE 3, although it shows rimmed discs that are formed with a conventional profile. This view is included herein in order to illustrate the prior art;

FIGURE 5 is an enlarged partial cross sectional view of the rim portion of another disc of the assembly of FIGURES 1 and 2.

Referring first to FIGURE 1, numeral 10 designates a power input shaft and numeral 12 designates a power output shaft. Shaft 10 extends through an opening 14 formed in a wall 16, suitable bearing means, not shown, being provided for this purpose at the left end of the shaft 10. The right-hand end of shaft 10 as viewed in FIGURE 1 is received within a pilot opening 18 in the power output shaft 12, and it is suitably journaled therein by a bushing as indicated. The shaft 12 is journaled within a hollow extension housing 20, a suitable bearing 22 being provided for this purpose. A bearing retainer is shown at 24, and it may be secured to the left-hand end of the housing extension 20 as indicated in FIGURE 1.

The wall 16 forms a portion of a transmission housing generally identified by reference character 26. The right-hand side of the housing 26 as viewed in FIGURE 1 is formed with an opening 28 within which the housing extension 20 is received. The circular clutch drum member 30 is concentrically positioned with respect to the power input shaft 10 and the power output shaft 12. An end wall 32 is splined or keyed to drum 30, said wall extending in a radial direction. The radially inward portion of wall 32 is positively connected to a hub 34 which in turn is journaled by means of bushings 36 and 38 to a reduced diameter portion of power input shaft 10.

The interior of member 30 is internally splined and it carries externally splined discs 40, said discs being conical in shape as indicated. A plurality of discs 40 is provided and each of the discs is capable of being shifted relative to the member 30 although relative rotation between the discs 40 and the member 30 is inhibited by the splined connection therebetween. A back-up plate 42 is also splined to the interior of member 30 and relative axial movement between plate 42 and member 30 is inhibited by a snap ring 44.

A clamping member 46 is located on the right side of the assembly of discs 40 and is connected to the member 30 by a splined connection which will accommodate a limited axial shifting movement. A clamping force can be applied to member 46 and to the discs 40 by an annular member 48 which is spring urged in a left-hand direction, as viewed in FIGURE 1, by compression springs 50 located at angularly spaced locations about the axis of the power input shaft 10. The springs 50 are anchored on the aforementioned wall 32.

A disc hub member 52 is positively connected to power input shaft 10, a suitable splined connection 54 being provided for this purpose. The hub member is externally splined for the purpose of carrying internally splined discs 56, the discs 56 being of a form similar to the aforementioned discs 40. A disc back-up plate 58 is also carried by hub member 52, and relative axial movement of plate 58 with respect to hub member 52 is prevented by a snap ring as indicated.

A clamping member 60 is also carried by hub member 52, and an axial clamping force can be applied to clamping plate 60 by a thrust member 62. This member 62 can be engaged by a movable piston 64 that is received within a cylinder member 66 mounted about power input shaft 10. The piston 64 and cylinder 66 cooperate to define the clutch pressure chamber. Fluid pressure can be admitted to this clutch pressure chamber through a port 68 formed in cylinder member 66 and through an axial passage 70 located in shaft 10. The passage 70 in turn communicates with an axially extending passage 72 that communicates with a fluid pressure source through a suitable passage structure shown in part at 74.

A relatively stationary spindle shaft 76 is received in a cantilever fashion within an opening 78 formed in wall 16 of the housing 26. A sleeve shaft 80 is rotatably journaled on shaft 76, and it has secured thereto an operating arm 82 extending in a direction transverse to the axis of shaft 10.

As best seen in FIGURE 2, a plurality of such spindle shafts 76 and sleeve shafts 80 is provided, and they each have been designated by corresponding reference numerals. The right-hand ends of the shafts 76 are joined together by an annular supporting member 84 which provides stability to the assembly.

As best seen in FIGURE 2, each of the sleeve shafts 80 has connected thereto an arm 86 having axially spaced portions. The spaced portions can best be observed by referring to FIGURE 1, and one pair of these spaced portions has been identified in FIGURE 1 by reference numerals 88 and 90. An externally splined carrier shaft 92 is carried by portions 88 and 90 of the shafts 80 and the shaft 92 in turn supports internally splined conical discs 94. These discs 94 are located in a group as indicated, each disc of the group being arranged in frictional driving engagement with the above described discs 40.

A second group of discs 96 is also carried by shaft 92, the discs 96 being internally splined in a fashion similar to discs 94. Each of the discs 96 is in driving frictional engagement with the above-described discs 56.

Each of the sleeve shafts 80 is also formed with a gear segment 98 that extends in a generally inward direction toward the axis of the shaft 10. Each of the segments 98 is disposed in meshing engagement with a gear 100 that is rotatably journaled on an extension 102 of the wall 16. This extension 102 is concentrically related with respect to power input shaft 10.

It will be apparent from the foregoing that when the arm 82 is rotated in a clockwise direction as viewed in FIGURE 2, each of the shafts 92 will be moved in a direction toward the axis of power input shaft 10. Conversely, when the arm 82 is moved in a counterclockwise direction as viewed in FIGURE 2, the shafts 92 will move outwardly with respect to the axis of power input shaft 10.

The mechanism for accomplishing the adjustment of arm 82 can best be observed in FIGURE 2, and it includes a servo motor 104 that is bolted or otherwise secured to the exterior of the housing 26. The motor 104 includes a piston that reciprocates in a direction transverse to the axis of power input shaft 10, and this piston is linked to arm 82 by means of a suitable linkage 106. The linkage 106 is pivotally connected to the radially outward extremity of arm 82.

Fluid pressure can be admitted to motor 104 through suitable passage structures shown in part in FIGURE 2 at 107, and distribution of fluid pressure to the motor 104 through the passage structure can be regulated by a suitable control mechanism, not shown.

For purposes of further discussion, the discs 40 will be referred to as ring discs, the discs 56 will be referred to as sun discs and the discs 94 and 96 will be referred to as carrier discs.

If it is assumed that the arm 82 and the carrier discs are located in the position shown in FIGURES 1 and 2, the mechanism will be conditioned for operation with its maximum speed ratio. The engine torque is distributed to shaft 10, and the sun discs are thus rotated along with the shaft 10. The radius of contact for the sun discs and the carrier discs 96 with respect to the axis of the associated shaft 92 is a minimum, and the carrier discs will therefore be overdriven with respect to the sun discs. The carrier discs 94 rotate in unison with the carrier discs 96 thereby imparting motion to ring discs 40. The radius of contact for the discs 94 and the ring discs 40 is at a maximum with respect to the axis of shafts 92. The motion thus imparted to the discs 40 is transmitted through drum member 30 and wall 32 to power output shaft 12.

To reduce the over-all speed ratio between shaft 12 and shaft 10, the arm 82 can be adjusted by the motor 104 in a counterclockwise direction as viewed in FIGURE 2. This will cause the carrier discs to move in a radially outward direction with respect to the axis of shaft 10. The radius of contact between carrier discs 96 and the sun discs with respect to the axis of shafts 92 will therefore increase, and the corresponding radius of contact for the carrier discs 94 and the ring discs 40 will correspondingly decrease. This results in an over-all decrease in the speed ration between shafts 10 and 12.

Referring next to FIGURE 3, I have illustrated in particular detail the profiles of the ring discs 40 and the carrier discs 94. The discs 94 are conical in form with the minimum axial cross sectional dimension occurring at the outermost extremity. The ring discs 40 are formed with rim portions 108. Each rim portion is formed with a flat surface 110 and the edges of the rim portions 108 are chamfered as indicated at 112 and 114. This chamfer produces a sharp discontinuity between the surfaces 110 and the adjacent edge surfaces at the chamfers. The surfaces 110 are conical and form a section of a cone, the cone angle being equal to the cone angle for the discs 94.

In FIGURE 4 I have illustrated the rim profiles for the discs of a conventional disc drive. It can be seen from FIGURE 4 that the rim portions, which are identified by reference character 108′, are formed with relatively large radii at either edge thereof. The intermediate portion of the rim profile is engageable with the conical surface of a cooperating conical disc which is identified in FIGURE 4 by reference character 94′. In this prior art arrangement, the point of maximum pressure in the contact region is located intermediate the inner and outer edges of the rim portions 108′. Lubricating oil is continuously supplied to the rotating discs during operation, and an oil film will be developed in each of the contact regions. In the prior art arrangement, therefore, the maximum shear stress will occur at the intermediate portion of the contact region and a substantial amount of cross flow will develop because of this pressure distribution pattern.

By way of contrast with the prior art arrangement, the point of maximum pressure concentration in my improved construction is located at the radially inward and radially outward margins of the contact regions. This is due to the sharp discontinuity in the surface profile for the rim portions 108. The amount of cross flow in a radial direction in the contact region is therefore reduced. It follows from this that the rate of oil film formation in the contact region will be relatively slight. At any given speed of rotation the oil film in my improved construction will be of a lesser thickness than in the case of the prior art arrangement of FIGURE 4.

Referring next to FIGURE 5, I have illustrated the rim portion for one of the sun discs, and it is of a form similar to the above-described rim portion 108. It includes a flat portion 116 that forms a portion of a cone segment with an angle equal to the cone angle for the discs 96. Each of the edges of the rim portions for the sun discs is chamfered, the chamfer angle being indicated by the symbol "α."

When the chamfer angle for the discs 56 and the discs 40 is increased, the stress concentration at the edges of the rim portions will increase accordingly. The optimum chamfer angle will depend upon the operating characteristics that are desired. Once having determined the optimum chamfer angle and the optimum area for the flat portion of the rim profiles, the operating characteristics will remain relatively constant regardless of wear.

Having thus described a preferred embodiment of my invention, what I claim and desire to secure by United States Letters Patent is:

1. A driving disc, a driven disc, and means for rotatably mounting said discs for rotation about parallel axes, the rim portion of one disc being engageable with the lateral surface of the other disc with a film of lubricant therebetween, said rim portion comprising a peripheral friction surface, the radially inward and outward portions of said friction surface being formed with sharp edges to retard the rate of lubricant film formation in the surface engaging region.

2. In a friction disc drive, a driving disc, a driven disc, and means for rotatably mounting said discs for rotation about parallel axes, the rim portion of one disc being engageable with a lateral surface of the other disc with a film of lubricant therebetween, said rim portion comprising a peripheral friction surface having radially inward and outward pointed edge portions of the lateral side of said rim portion to retard the rate of lubricant film formation in the surface engaging region.

3. In a friction disc drive, a driving disc, a driven disc, and means for rotatably mounting said discs for rotation about parallel axes, one of said discs having lateral surfaces of conical profile, the other disc having a rim portion engageable with a lateral conical surface of said one disc with a film of lubricant therebetween, said rim portion comprising a peripheral friction surface in the form of a conical segment, the radially inward edge and the radially outward edge of said friction surface being sharp to retard the rate of lubricant film formation in the surface engaging region.

4. In a friction disc drive, a driving disc, a driven disc, and means for rotatably mounting said discs for rotation about parallel axes, one of said discs having lateral surfaces of conical profile, the other disc having a rim portion engageable with a lateral conical surface of said one disc with a film of lubricant therebetween, said rim portion comprising a peripheral friction surface in the form of a conical segment, the radially inward edge and the radially outward edge of said friction surface being sharp to retard the rate of lubricant film formation in the surface engaging region, the cone angle for said friction surface being substantially equal to the cone angle for the conical profile of the lateral surface of said one disc.

5. In a friction disc drive, a driving disc, a driven disc, and means for rotatably mounting said discs for rotation about parallel axes, one of said discs having lateral surfaces that are conical in form, the other of said discs having a rim portion engageable with a lateral surface of said one disc with a film of lubricant therebetween, said rim portion comprising a peripheral friction surface in the form of a conical segment having pointed edge portions at the lateral sides of said rim portion to retard the rate of lubricant film formation in the surface engaging region.

6. In a friction disc drive, an assembly of driving discs, an assembly of driven discs, a lubricating oil covering said discs, and means for rotatably mounting each assembly for rotation about parallel axes, the rim portions of the discs of one assembly being engageable with the lateral surfaces of the discs of the other assembly, the discs of one assembly being disposed in interdigital relationship with respect to the discs of the other assemby, said rim portions each comprising a peripheral friction surface, the radially inward and outward portions of said friction surface being formed with sharp edges at the lateral sides of each rim portion to retard the rate of lubricant film formation in the surface engaging region.

7. In a friction disc drive, an assembly of lubricated driving discs, an assembly of lubricated driven discs, and means for rotatably mounting each assembly for rotation about parallel axes, the discs of one assembly being disposed in interdigital relationship with respect to the discs of the other assembly, the lateral sides of the discs of one assembly being of conical form, the rim portions of the discs of the other assembly being engageable with the conical lateral sides of the discs of the other assembly, said rim portions each comprising peripheral friction surfaces in the form of a conical segment, the radially inward and outward portions of each friction surface being formed with sharp edges at the lateral sides of each rim portion to retard the rate of lubricant film formation in the surface engaging region.

8. In a friction disc drive, an assembly of lubricated driving discs, an assembly of lubricated driven discs, and means for rotatably mounting each assembly for rotation about parallel axes, the discs of one assembly being disposed in interdigital relationship with respect to the discs of the other assembly, the lateral sides of the discs of one assembly being of conical form, the rim portions of the discs of the other assembly being engageable with the conical lateral sides of the discs of the other assembly, said rim portions each comprising peripheral friction surfaces in the form of a conical segment, the radially inward and outward portions of each friction surface being formed with sharp edges at the lateral sides of each rim portion to retard the rate of lubricant film formation in the surface engaging region, the cone angle for said conical segment being substantially equal to the cone angle for the profiles of said lateral surfaces.

9. In a friction disc drive, an assembly of sun discs, an assembly of ring discs, means for rotatably mounting said sun and ring discs for rotation about a common axis, said sun discs being connected to a first torque delivery member, said ring discs being connected to another torque delivery member, lubricated planet discs situated between said sun and ring discs, said planet discs being disposed in interdigital relationship with respect to said sun discs and said ring discs, means for rotatably mounting said planet discs for rotation about a common axis, said planet discs having lateral sides of conical profile, said sun discs having outer peripheral edges that are engageable with the lateral surfaces of said planet discs, said ring discs having inner peripheral surfaces that are engageable with the latter surfaces of said planet discs, said rim portions each comprising friction surfaces, the radially inward and radially outward portions of said friction surfaces being formed with sharp edges at the lateral sides of each rim portion to retard the rate of lubricant film formation in the surface engaging region, said friction surfaces being in the form of a conical segment.

10. In a friction disc drive, an assembly of sun discs, an assembly of ring discs, and means for rotatably mounting said sun and ring discs for rotation about a common axis, said sun discs being connected to a first torque delivery member, said ring discs being connected to another torque delivery member, lubricated planet discs situated between said sun and ring discs, said planet discs being disposed in interdigital relationship with respect to said sun discs and said ring discs, means for rotatably mounting said planet discs for rotation about a common axis, said planet discs having lateral sides of conical profile, said sun discs having outer peripheral edges that are engageable with the lateral surfaces of said planet discs, said ring discs having inner peripheral surfaces that are engageable with the lateral surfaces of said planet discs, said rim portions each comprising friction surfaces, the radially inward and radially outward portions of each friction surface being chamfered to form sharp edges at the lateral sides of each rim portion to retard the rate of lubricant film formation in the surface engaging region, said friction surfaces being in the form of a conical segment, the cone angle for each conical segment being substantially equal to the cone angle for the conical profile of said planet discs.

11. In a friction disc drive, an assembly of sun discs, an assembly of ring discs, means for rotatably mounting said sun and ring discs for rotation about a common axis, said sun discs being connected to a first torque delivery member, said ring discs being connected to another torque delivery member, lubricated planet discs situated between said sun and ring discs, said planet discs being disposed in interdigital relationship with respect to said sun discs and said ring discs, means for rotatably mounting said planet discs for rotation about a common axis, said planet discs having lateral sides of conical profile, said sun discs having outer peripheral edges that are engageable with the lateral surfaces of said planet discs, said ring discs having inner peripheral surfaces that are engageable with the lateral surfaces of said planet discs, said rim portions each comprising friction surfaces, the radially inward and outward portions of said friction surfaces being formed with sharp edges at the lateral sides of each rim portion to retard the rate of lubricant film formation in the surface engaging region, said friction surfaces being in the form of a conical segment, the cone angle for each conical segment being substantially equal to the cone angle for the conical profile of said planet discs, and means for applying a clamping pressure to said sun discs and said ring discs to establish frictional driving contact between said planet discs and said ring discs and between said sun discs and said planet discs.

12. In a friction disc drive, a driving disc, a driven disc, and means for rotatably mounting said discs for rotation about parallel axes, one of said discs having lubricated lateral surfaces that are conical in form, the other of said discs having a rim portion engageable with a lateral surface of said one disc, said rim portion comprising peripheral friction surfaces in the form of a conical segment, the radially inward edge and the radially outward edge of said surfaces being pointed to retard the rate of lubricant film formation in the surface engaging region, said pointed edges forming sharp surface divergencies from the one disc lateral surface, the angle of divergence being between 30° and 60°.

References Cited in the file of this patent
UNITED STATES PATENTS

| | | |
|---|---|---|
| 1,800,718 | Collins et al. | Apr. 14, 1931 |
| 2,020,677 | Erban | Nov. 12, 1935 |
| 2,841,019 | Beier | July 1, 1958 |
| 2,915,907 | Giskes | Dec. 8, 1959 |